June 6, 1939.  P. MARX  2,161,180
APPARATUS FOR MELTING METALS
Filed April 15, 1937
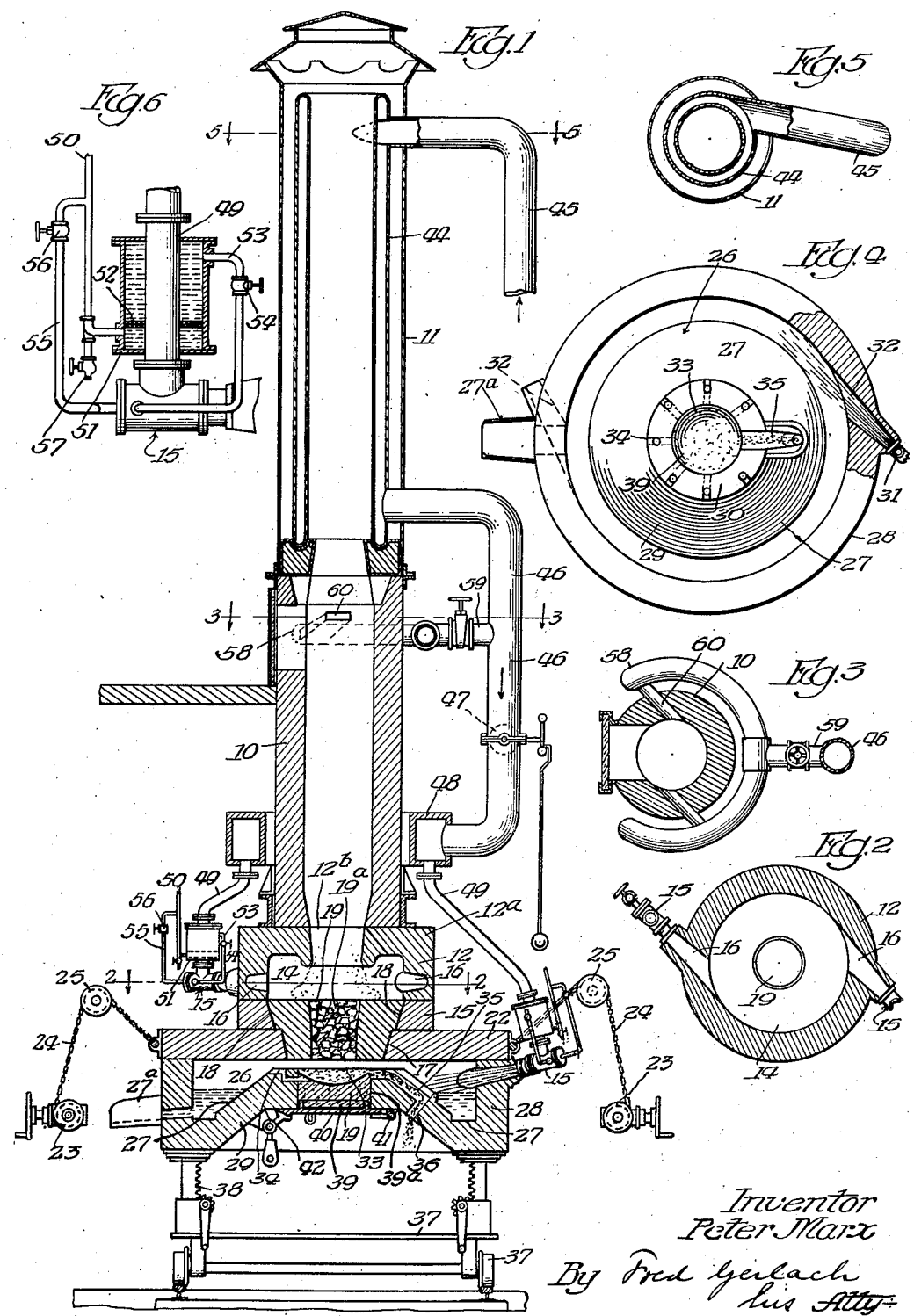
Inventor
Peter Marx
By Fred Gerlach
his Atty.

Patented June 6, 1939

2,161,180

UNITED STATES PATENT OFFICE 2,161,180

APPARATUS FOR MELTING METALS

Peter Marx, Hennef-on-the-Sieg, Germany

Application April 15, 1937, Serial No. 137,000
In Germany April 27, 1936

5 Claims. (Cl. 266—11)

The invention relates to apparatus for melting metals.

One object of the invention is to provide an improved apparatus for continuously melting metal in a fuel-fired cupola which is adapted to produce low carbon iron economically, and expeditiously. Heretofore, it has been common to produce low carbon iron by melting and then separately refining it in an electric furnace. This method involved expensive equipment and high operation costs.

The present invention contemplates the melting and refining of the metal in a unitary cupola structure which comprises a fuel-fired melting chamber at the lower end of the stack containing the charge and a subjacent fuel-fired refining chamber, which receives the melted metal from the heating chamber and from which the heat passes to the melting chamber and the stack for economical operation.

Another object of the invention is to provide a cupola in which the refining chamber and the structure intermediate the refining chamber and the melting chamber are removably supported underneath a permanently built-in shaft to facilitate the care and repair of the walls or linings of the melting and heating chambers.

Another object of the invention is to provide improved means in the refining chamber for separating the slag from the metal after it leaves the melting chamber but before it passes to the bath in the refining chamber.

Another object of the invention is to provide an improved construction in which the dome of the hearth in the refining chamber is provided with a well for receiving the melted metal from the melting chamber and forming a well in a refractory material which can be readily replaced and repaired.

Other objects of the invention will appear from the detail description.

The invention consists in the several novel features which are hereinafter set forth and are more particularly defined by claims at the conclusion hereof.

In the drawing: Fig. 1 is a vertical section of a cupola furnace embodying the invention. Fig. 2 is a horizontal section taken on line 2—2 of Fig. 1. Fig. 3 is a section on line 3—3 of Fig. 1. Fig. 4 is a plan of the refining hearth, its roof being removed. Fig. 5 is a section on line 5—5 of Fig. 1. Fig. 6 is a vertical section of the heat-exchanger for preheating the liquid fuel by means of heated air from the stack.

The cupola furnace comprises a vertical shaft 10 having a refractory-wall, a smoke-stack 11 for the products of combustion, supported on top of the shaft, and a base permanently built with the lower end of the shaft 10. This base provides a melting chamber 14 below and communicating with the lower end of the shaft 10 and comprises an annular depending side wall 12 and a top-wall 12$^a$ having an opening 12$^b$ which communicates with the shaft. Suitable burners 13 are adapted to deliver liquid, gaseous, or pulverized fuel under pressure tangentially into the heating chamber 14 through tangential ducts 16 in the wall 12$^a$. The heat from chamber 14 passes through opening 12$^b$ into the lower end of shaft 10 for melting the metal in the shaft. A wall 15 is separate from and abuts against the bottom of annular wall 12$^a$. A conduit or throat-member 17 of refractory material is separately formed from wall 15, is held in a conical seat 18 in said wall 15 and forms the bottom of the melting chamber 14. This separability of the wall 15 from wall 12$^a$ and the separability of member 17 from wall 15 facilitate replacement and care of said member and wall 15 which forms the bottom of the heating chamber. Member 17 has a central vertical opening 19 for the passage of heat from a refining chamber 26 under the heating chamber 14 to the melting chamber 14 and for the flow of metal from the melting chamber 14 to the refining chamber 26. The opening 19 in the member 17 contains open-work refractory 19$^a$ which permits heat from the refining chamber to pass to the melting chamber 14 and thence to the shaft 10 and at the same time distributes the melted metal to cause it to drop or trickle to the refining chamber. The member 17 extends through and fits in a central opening in wall 22. The member 17 and wall 15 are movably and interchangeably supported on a wall 22 which forms the roof of refining chamber 26. Said roof-wall 22 is, together with the wall 15 and member 17, supported so it can be lowered away from the melting chamber 14 to provide access to the melting chamber 14 and member 17 for care or replacement. Lifting and suspension devices are provided for raising and lowering and supporting walls 22, 15 and member 17. Each of said devices comprises a manually operable windlass 23, a chain 24, passing around a sheave 25 having one of its ends attached to wall 22 and the other to the windlass. Sheaves 24 and windlass 23 are supported on any suitable permanent or fixed structure.

The refining chamber 26 is disposed under, and is separate from, the roof-wall 22 and comprises a hearth 27 and an annular vertical wall 28, the upper edge of which abuts against the roof-wall 22. The hearth 27 is provided at its center with an upwardly tapered truncated cone or inclined dome 29 which terminates in a top face 30 closely adjacent to the plane of the bottom face of roof-wall 22 and the lower end of liner 17. One or more burners 31 deliver any suitable fuel through tangential ducts 32 into the refining chamber 26 for refining the melted metal.

The upper face 30 of the cone 29 in the refining chamber is provided with a concave well 33 into which the melted metal drips from the refractory 19ª in duct 19. The cleaner portion of the metal descends to the bottom of the well 33 and is discharged through ducts 34 onto the side of the dome 29 over which it flows to the hearth 27 of the refining chamber. The slag accumulates on the top of the metal in the well 34 and is discharged through a channel 35 in the top and side of the cone 29 into an outlet 36 which extends through the wall of the cone so it will pass out of the refining chamber without flowing to or correspondingly with the melt on the hearth 27.

The hearth 27 and wall 28 for the refining chamber are separable from the roof-wall 23 and are supported on lifting jacks 38 carried by a wheeled truck 37. The jacks 38 are adapted to raise and lower the refining chamber and hearth away from and up to the roof-wall 22. When lowered away from said wall, the refining chamber can be rolled away on the truck. When the refining chamber has been removed, the walls 22 and 15 and member 17 will be supported by the lifting chains 24 and can be lowered away from the melting chamber 14. The burners 15 are supported independently of the refining chamber so the latter can be raised or lowered and removed while the burners remain in position. This removability and separability of the refining chamber and the structure intermediate the melting chamber 14 and the refining chamber, render all of said parts readily accessible for care, repair or replacement. When the refining chamber is raised by means of jacks 38, wall 28 of the refining chamber can be jammed against the roof-wall 22 and the latter will jam the wall 15 against the lower end of wall 12 of the melting chamber. This makes it possible to maintain tight connection between these walls for heat conservation.

The central portion of the dome 29 in the refining chamber in which the well 33 is preferably formed, consists of a suitable replaceable refractory 39 which is supported in a vertical opening 39ª extending through the dome by a gate 40 which is hinged at 41 and detachably locked in place by a weighted latch 42 which is adapted to automatically lock the gate in its raised position and can be swung to release the gate when the refractory 39 is to be removed or replaced. When the refractory 39 is removed, the residue in the well 33, heating chamber 14, member 17 and shaft 10 can be removed. A discharge spout 27ª is provided on the refining chamber for drawing off the refined metal.

A double-walled air-heating jacket 44 in the smoke-stack 11 is supplied with air under pressure through pipe 45, which delivers air tangentially into the jacket (Fig. 5). The air is heated in the jacket 44 and is delivered through a pipe 46 under control of a valve 47 into an annular header or wind-box 48 around the shaft 10. Pipes 49 deliver the heated air to the burners 15 and 31, respectively. When liquid fuel is used, it is preheated in its passage to the burners. For this purpose each fuel-delivery pipe 50 conducts the fuel into a tank 51 which contains a filter 52. An outlet pipe 53 delivers the filtered fuel from top of tank 51 under control of a valve 54 into the burner. A by-pass 55 is adapted to deliver oil under control of a valve 56 directly from the supply-pipe 50 to the burner. A test-cock 57 is connected to supply pipe 50. A closed charging opening 58 is provided in the upper end of the shaft 10. Hot air is also delivered into the upper end of the shaft for additional combustion by means of a branch 59 of hot air pipe 46 and tangential ducts 60 which are supplied with hot air from said branch 59.

In carrying out the method and operation of the apparatus, the charge of materials to be melted is placed in the shaft 10 through the charging door 58. The lower end of the charge rests on the throat-member 17 which forms a part of the bottom of the melting chamber 14. Fuel delivered into the chamber 14 through burners 15 melts the metal at the bottom of the stack and in chamber 14. The products of combustion pass upwardly through shaft 10 and to and through the smokestack 11. Until melted, the charge will partially rest on the refractory openwork 19ª in the duct 19 in member 17. As the charge melts, it will trickle through the openwork refractory 19ª into the well 33 in the dome of the refining hearth. The slag will flow from the top of the well through duct 35 to the discharge opening 36. The pure metal will flow from the bottom of well 33 through ducts 34 to the inclined side of the dome 29 and flow onto the hearth and into the bath thereon. The fuel delivered into the refining chamber 26 will heat the metal and refine it. The heat from the refining chamber will pass upwardly through the duct 19 in member 17 to the melting chamber 14 and from said chamber to the shaft 10. In this manner, the heat from the refining chamber will be utilized in the melting chamber. This method and apparatus are adapted for continuous melting and refining. This method involves melting the charge in the melting chamber at the bottom of the stack of the cupola, discharging the melted metal into the fuel-fired refining chamber below the heating chamber and refining the metal in the latter chamber.

A characteristic of the invention is that the metal from the melting chamber passes into a well at the top of the refining chamber where the slag is separated from the purer metal and discharged before it reaches the bath in the refining chamber. This is a factor in producing low carbon iron because it prevents the metal on the hearth of the refining chamber from becoming impure with detrimental sulphur and high in carbon, by eliminating the slag before the metal reaches the hearth of the refining chamber.

The invention also exemplifies a method and apparatus by which melting and refining of the metal can be expeditiously and economically carried on.

The separate removability of the hearth and side-wall of the refining chamber permits the refining hearth with its dome to be disconnected from the remainder of the cupola and wheeled away for care or repair. The lifting jacks 38 on the truck 37 make it possible to securely support the roof-wall 22 and intermediate wall 15 in closely fitting relation with the wall 15 abutting against the lower end of the side wall 12 of the melting chamber. The removability of the roof-wall 22 and the separability of wall 15 and member 17 from the roof-wall, also facilitate their care and replacement.

The invention is not to be understood as restricted to the detail set forth, since these may be modified within the scope of the appended claims, without departing from the spirit and scope of the invention.

Having thus described the invention, what I claim as new and desire to secure by Letters Patent is:

1. In a cupola furnace, the combination of a vertical shaft for retaining a charge to be melted, a fuel-fired melting chamber under the shaft, a fuel-fired refining chamber communicating with the melting chamber and having a bottom provided with an upstanding dome having a vertically extending opening therethrough and a refractory filling in the opening, a vertical duct leading from the melting chamber to discharge the melted metal on top of the dome, and a gate under the filling for permitting removal of the refractory from the opening.

2. In a cupola furnace, the combination of a vertical shaft for retaining a charge to be melted, a fuel-fired melting chamber under the shaft, a fuel-fired refining chamber under the melting chamber, a vertical duct between the melting and the refining chambers, an upstanding dome on the bottom of the refining chamber disposed under the duct so the melted metal will be discharged from the melting chamber onto the top of the dome and provided with an opening extending vertically therethrough, and a refractory-material in the opening in the dome, and having a well in the top thereof into which the metal flows from the duct, and a gate under the filling for permitting removal of the refractory.

3. A cupola comprising a vertical shaft adapted to retain the charge to be melted, a fuel-fired melting chamber and a fuel-fired refining chamber, the shaft and chambers being vertically coaxial, the melting chamber being of greater diameter than, and having a horizontal roof extending outwardly from, the lower end of the shaft, said roof being provided with a central opening connecting the shaft and the melting chamber, the refining chamber being of greater diameter than the melting chamber and provided with a horizontally extending roof with a central vertical opening connecting the refining chamber and the melting chamber, and an upstanding dome in the refining chamber, onto the top of which the metal from the melting chamber flows for distribution in the refining chamber.

4. A cupola comprising a vertical shaft adapted to retain the charge to be melted, a fuel-fired melting chamber and a fuel-fired refining chamber, said chambers and shaft being vertically coaxial, a central duct for the melted metal between the melting chamber and the refining chamber, the refining chamber having a hearth and means disposed above the hearth for receiving the metal from the melting chamber and separating slag from the metal before it passes to the bath in the refining chamber.

5. A cupola comprising a vertical shaft adapted to retain the charge to be melted, a fuel-fired melting chamber and a fuel-fired refining chamber, said chambers and shaft being vertically coaxial, a central duct for the melted metal between the melting chamber and the refining chamber, the refining chamber having a hearth, and an upstanding dome on the hearth which receives the melted metal from the melting chamber, provided with means for separating slag from the metal before it passes to the bath in the refining chamber.

PETER MARX.